(12) United States Patent
Dalcher

(10) Patent No.: US 8,707,434 B2
(45) Date of Patent: Apr. 22, 2014

(54) SYSTEM AND METHOD FOR INDIRECT INTERFACE MONITORING AND PLUMB-LINING

(75) Inventor: Gregory W. Dalcher, Washington County, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/211,999

(22) Filed: Aug. 17, 2011

(65) Prior Publication Data

US 2013/0047255 A1 Feb. 21, 2013

(51) Int. Cl.
 *G06F 11/00* (2006.01)
(52) U.S. Cl.
 USPC .............................................. 726/23; 726/24
(58) Field of Classification Search
 None
 See application file for complete search history.

(56) References Cited

U.S. PATENT DOCUMENTS

| | | | |
|---|---|---|---|
| 5,974,549 A | 10/1999 | Golan | |
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,353,033 B1 * | 1/2013 | Chen et al. | 726/23 |
| 2005/0071633 A1 | 3/2005 | Rothstein | |
| 2005/0108562 A1 | 5/2005 | Khazan et al. | |
| 2009/0113111 A1 | 4/2009 | Chen et al. | |
| 2010/0011209 A1 | 1/2010 | Kiriansky et al. | |
| 2010/0064367 A1 * | 3/2010 | Lysemose Hansen | 726/23 |
| 2011/0083176 A1 * | 4/2011 | Martynenko et al. | 726/13 |
| 2012/0255000 A1 * | 10/2012 | Sallam | 726/23 |

OTHER PUBLICATIONS

U.S. Appl. No. 11/626,808, filed Jan. 24, 2007.
U.S. Appl. No. 11/749,635, filed May 16, 2007.
U.S. Appl. No. 12/019,514, filed Jan. 24, 2008.
U.S. Appl. No. 12/042,923, filed Mar. 5, 2008.
U.S. Appl. No. 12/111,851, filed Apr. 29, 2008.
International Search Report and Written Opinion, mailed Dec. 10, 2012, International Application No. PCT/US2012/048415.

* cited by examiner

*Primary Examiner* — Nirav B Patel
*Assistant Examiner* — Mohammed Waliullah
(74) *Attorney, Agent, or Firm* — Patent Capital Group

(57) ABSTRACT

A method is provided in one example embodiment that includes monitoring a first interface, monitoring a second interface, and taking a policy action if the second interface is not executed before the first interface. In more particular embodiments, monitoring the second interface may include walking a call stack associated with the first interface. Moreover, a program context for calling code associated with the second interface may be identified and acted upon.

17 Claims, 7 Drawing Sheets

SYSTEM AND METHOD FOR INDIRECT INTERFACE MONITORING AND PLUMB-LINING

TECHNICAL FIELD

This specification relates in general to the field of information system security, and more particularly, to a system and method for indirect interface monitoring and plumb-lining.

BACKGROUND

Information systems have become integrated into the daily lives of people and businesses on a global scale, and the field of information security has likewise become increasingly important in today's society. However, such wide scaled integration has also presented many opportunities for malicious operators to exploit these systems. Once malicious software has infected a host computer, it can perform any number of malicious actions, such as sending out spam or malicious emails from the host computer, stealing sensitive information from a business or individual associated with the host computer, propagating to other host computers, and/or assisting with distributed denial of service attacks. In addition, for some types of malware, a malicious operator can sell or otherwise give access to other malicious operators, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes monitoring a first interface, monitoring a second interface, and taking a policy action if the second interface is not executed before the first interface. In more particular embodiments, monitoring the second interface may include walking a call stack associated with the first interface. Moreover, a program context for calling code associated with the second interface may be identified and acted upon.

EXAMPLE EMBODIMENTS

Figure 1:
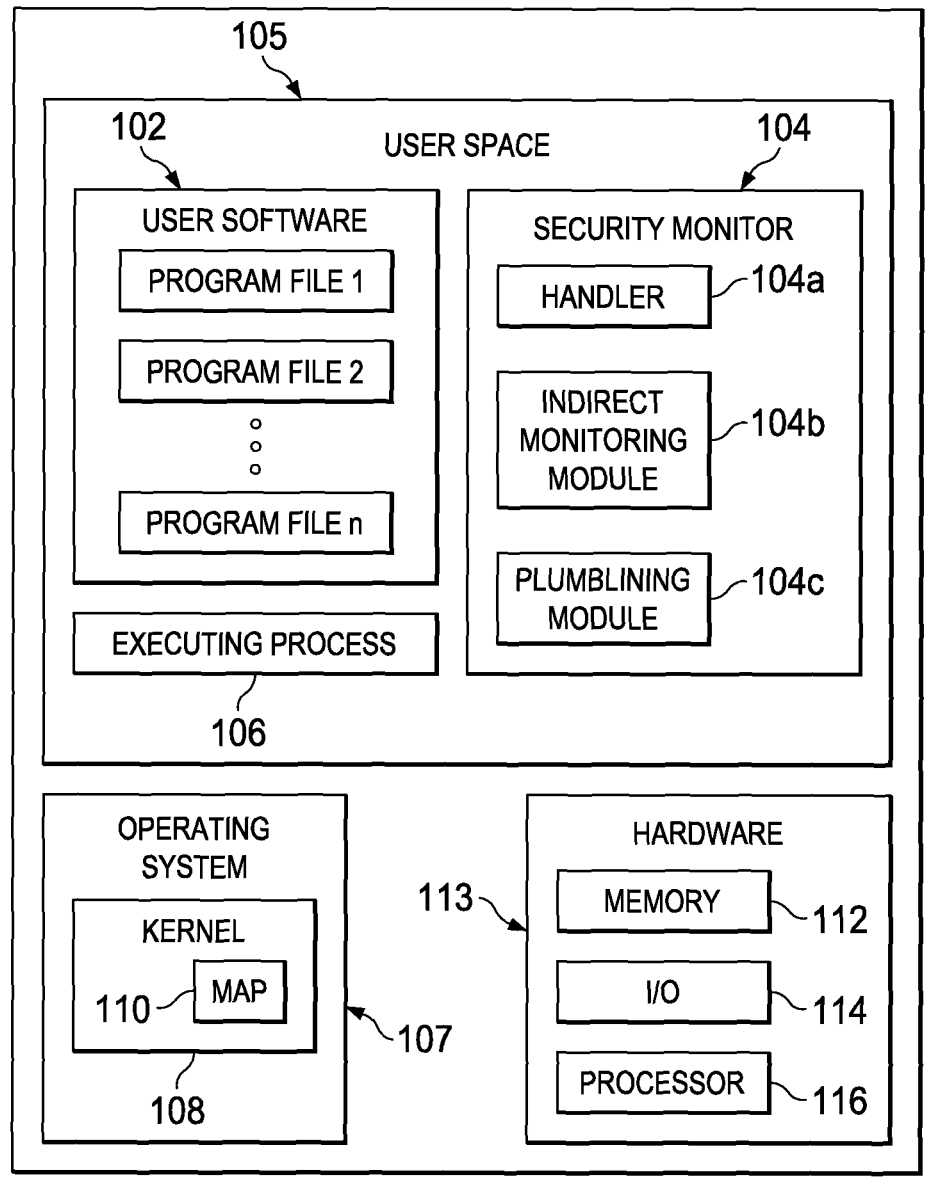
FIG. 1 is a simplified schematic illustrating an example embodiment of a host environment according to this specification.

Turning to FIG. 1, FIG. 1 is a schematic of one embodiment of a host environment 100 in which a system and method for indirect interface monitoring and plumb-lining may be implemented. Host environment 100 includes user software 102 and a security monitor 104, which can both execute in a user space 105. User software 102 may include, for example, program files 1 through n. Security monitor 104 may include a handler 104a, an indirect monitoring module (IMM) 104b, and a plumb-lining module 104c. In one embodiment of host environment 100, each of program files 1 through n may represent distinct user mode applications, such as a word processor, spreadsheet, web browser, email client, etc. Also shown in user space 105 of host environment 100 is process 106, which is an example of an executing process corresponding to one or more of program files 1 through n.

An operating system 107 may include a kernel 108 that can provide a process traffic mapping element 110 for mapping a process (e.g., process 106) to a corresponding program file of user software 102. For ease of reference, user software 102 is shown in user space 104 of host environment 100, although it may be stored in a data storage component, such as a memory element 112.

Host environment 100 may also include hardware 113 such as a input/output (I/O) device 114 and a processor 116, as well as additional hardware (not shown) in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc. In addition, suitable modems and/or additional network adapters may also be included for allowing network access. Host environment 100 may include any additional hardware and software necessary to properly perform their intended functions. Furthermore, any suitable operating systems may be configured in host environment 100 to appropriately manage the operation of hardware components therein. The hardware configurations may vary and the depicted examples are not meant to imply architectural limitations. Moreover, host environment 100 is merely representative of an environment that provides at least basic capabilities for loading security monitor 104. A web browser is an example of another type of host environment in which indirect interface monitoring and plumb-lining may be implemented.

For purposes of illustrating the principles of indirect interface monitoring and plumb-lining in a host environment such as host environment 100, it is important to understand the activities and communications occurring within such an environment. The following foundational information may be viewed as a basis from which the present disclosure may be properly explained. Such information is offered earnestly for purposes of explanation only and, accordingly, should not be construed in any way to limit the broad scope of this specification and its potential applications.

Malicious operators are continuously developing new tactics for using malware, which generally includes any software designed to access and/or control a computer without the informed consent of the computer owner, and is most commonly used as a label for any hostile, intrusive, or annoying software such as a computer virus, bot, spyware, adware, etc. Once a host is compromised, malware may subvert the host and use it for malicious activity, such as spamming or information theft, or even to disable the host. Malware also typically includes one or more propagation vectors that enable it to spread within a network or across other networks to other organizations or individuals. Common propagation vectors include exploiting known vulnerabilities on hosts within the local network and sending malicious emails having a malicious program attached or providing malicious links within the emails.

Security software focused on preventing unauthorized program files from executing in a host environment may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data facilitate legitimate and necessary business activities. Such systems may be so restrictive that if unauthorized software is found on a host computer, any host computer activities may be suspended pending network administrator intervention. Moreover, at the network level there may simply be too many applications to effectively track and incorporate into policies. Large whitelists or blacklists can be difficult to maintain and may degrade network performance, and some applications may not be susceptible to easy identification.

Additionally, security software can often depend upon casting a wide net of systems monitoring throughout its host environment. However, a host environment may often have infrastructure limits to what can be monitored by security software. For instance, within some embedded environments such as Windows Mobile, it may not be possible to directly monitor interfaces through inline hooking since interface code may be executing from immutable memory. Some environments may also deliberately restrict the ability of security software to monitor the environment. An example is the prevention of direct kernel mode interface monitoring that 64-bit versions of MICROSOFT WINDOWS operating systems impose through kernel patch protection (informally known as "PatchGuard").

Malware continues to employ increasingly sophisticated techniques for evading detection by security software, particularly systems monitoring techniques. Examples include avoiding upper level interface monitoring by bypassing upper level interfaces and instead directly invoking lower level interfaces that an upper level interface would have invoked itself.

Hence, many challenges remain for providing systems monitoring beyond what is natively supported by a host environment (e.g., an operating system, web browser, etc.) and for hardening systems monitoring against malware evasion.

In accordance with embodiments described herein, host environment 100 can overcome these shortcomings (and others), extending systems monitoring by providing a security monitor for indirect interface monitoring and plumb-lining. Such indirect interface monitoring and plumb-lining may provide for collection of a greater amount of information about system usage than direct monitoring may allow, either because of difficulties implementing comprehensive direct monitoring or host restrictions against direct monitoring.

Indirect interface monitoring may also detect usage not immediately associated with an intercepted lower-level operation. For example, execution of an upper-level interface to render a web page may result in a file write intercepted by a file system filter as a lower-level operation. A call frame for the web page rendering interface use may be identified (along with the use of the rendering interface) through stack walking and function identification. Thus, interface use may be identified even if the intercepted lower-level operation is not directly associated with the upper-level interface.

The hardening of upper-level interface monitoring as described herein may also allow these monitors to be trusted. Placing such upper-level monitors can often be easier than monitoring lower-level interfaces, particularly since they may not be prevented by host restrictions. For example, on Windows 64-bit systems, PatchGuard may prevent direct monitoring of kernel mode interfaces, but user mode interfaces may still be monitored directly.

In one embodiment, host environment 100 may provide systems monitoring capabilities, such as file system filtering. In general, "monitoring" an interface refers to any systematic tracking of the interface's invocation or execution, and may include collecting, storing, or recording additional information associated with the invocation or execution. The security module may use these capabilities to infer additional information about system usage, including interface invocations that may not be monitored directly. Thus, a distinction is drawn herein between "direct interface monitoring" (or simply "interface monitoring") and "indirect interface monitoring." "Direct interface monitoring" (or "interface monitoring") refers to monitoring an interface, such as by in-line hooking, interface pointer redirection, or callbacks provided by the underlying infrastructure or operating system, for example. "Indirect interface monitoring" refers to monitoring a first interface to track invocation or execution of a second interface. Host environment 100 may also use plumb-lining to identify malware that is attempting to bypass upper layer interface monitoring.

Thus, in one example embodiment of host environment 100, security monitor 104 may use systems monitoring techniques supported by host environment 100, which may include, for example, file systems monitoring, network monitoring, and monitoring database configuration updates (e.g., monitoring Registry operations in Microsoft Windows operating systems). Such monitoring techniques can provide callbacks to a registered handler (e.g., handler 104a) when operations of interest occur. For example, a callback may be registered for invocation whenever any file is opened. Callbacks may be either synchronous or asynchronous. A synchronous callback is invoked while the original operation is held, and may be invoked within the context of the originating thread or in an arbitrary (undetermined) thread. An asynchronous callback is invoked in an arbitrary thread while the original operation is allowed to continue.

Turning to the infrastructure of FIG. 1, host environment 100 is representative of an example architecture in which a system for indirect interface monitoring and plumb-lining may be implemented. In regards to the internal structure associated with host environment 100, hardware 113 can include memory elements (as shown in FIG. 1) for storing information to be used in the operations outlined herein. Additionally, host environment 100 may include a processor (as shown in FIG. 1) and one or more virtual processors that can execute software or an algorithm to perform activities as discussed herein.

These devices may further keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein should be construed as being encompassed within the broad term 'memory element.' The information being tracked or sent by components of host environment 100 (e.g., security monitor 104) could be provided in any database, register, control list, or storage structure, all of which can be referenced at any suitable timeframe. Any such storage options may be included within the broad term 'memory element' as used herein.

Note that in certain example implementations, the functions outlined herein may be implemented by logic encoded in one or more tangible, non-transitory media (e.g., embedded logic provided in an ASIC, digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described herein.

A processor can execute any type of instructions associated with the data to achieve the operations detailed herein. In one example, a processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), EPROM, EEPROM) or an ASIC that includes digital logic, software, code, electronic instructions, or any suitable combination thereof. Any of the potential processing elements, modules, and machines described herein should be construed as being encompassed within the broad term 'processor.' Each of the network elements can also include suitable interfaces for receiving, transmitting, and/or otherwise communicating data or information in a network environment.

In general, "software" refers broadly to any collection of programs and related data that can control hardware. As used herein, a "program" refers broadly to any instruction or code that can be executed in a processor, inclusive of a subroutine, function, instruction set, code block, application, module, library, and other similar programming units. A program may need to go through an operating system in order to use any hardware, particularly a program in user space (i.e., a "user mode application"). With the aid of firmware and device drivers, an operating system can provide the most basic level of control over hardware in a host environment. It can manage memory access for programs in RAM, determine which programs get access to which hardware resources, set up or reset a processor's operating states, and organize data for long-term non-volatile storage with file systems in memory elements, such as disks, tapes, flash memory, etc. An operating system may act as an interface between a user mode application and hardware components.

A kernel is the main component of most operating systems, and it is essentially a bridge between software and hardware. The kernel's responsibilities can include managing a host environment's resources and providing the lowest-level abstraction layer for the resources (e.g., processors and I/O devices) that software must control to perform its function. It typically makes these facilities available to processes through inter-process communication mechanisms and system calls.

In general, a "process" is an instance of a program being executed, and may include both instructions associated with a program and processor state. Depending on the host environment, a process may consist of smaller execution elements (e.g., fibers or threads) that execute instructions concurrently. Processes typically operate with constantly changing states (or contexts), such as data in process registers, control registers, memory, tables, or lists. What constitutes context may depend on underlying hardware and operating system software, but in general, context includes a minimal set of data required to resume execution if a process is interrupted. However, it can also refer to any information that may be useful in understanding the environment or circumstances of an intercepted event.

To run a program, a kernel typically sets up an address space for the program, loads the file containing the program's code into memory, sets up a call stack for the program, and branches to a given location inside the program, thus starting its execution. A call stack (or "stack") is a stack data structure that stores information about active processes in an environment. A call stack can be used for several related purposes, but typically tracks the point to which each active process should return control when it finishes executing. To accomplish this, a calling process can "push" a return address onto the call stack, while a called process can "pop" the return address off the call stack and transfer control to that address when it terminates. There is usually only one call stack associated with an execution element, such as a task or thread.

A call stack is generally composed of stack frames, which are machine dependent data structures containing state information. Each stack frame corresponds to a call to code that has not yet terminated with a return. The stack frame at the top of the stack corresponds to the currently executing code. The stack frame usually includes the arguments (parameter values) passed to the code (if any), the return address back to the caller, and space for local variables (if any).

To actually perform useful work, a program must be able to access the services provided by the kernel. Not all kernels implement access to services in the same way, but most provide a C library or an application programming interface (API), which in turn invokes the related kernel functions (i.e., makes a "service call"). As used herein, the term "interface" is construed broadly, though, to include any program (or library of programs) that allows one component in a host environment to access, control, or use a service, feature, function, or the like of another component in the host environment or the host environment itself.

An operating system may also support monitoring of at least some interfaces and provide callbacks to registered programs (e.g., handlers or agents). In general, a callback is a reference to executable code, or a piece of executable code, that is passed as an argument to other code. This allows a lower-level program to call a program defined in a higher-level layer. Thus, if a program calls an interface to access a service, for example, the event can trigger a registered callback with the event context if the operating system supports monitoring of that interface. Information passed to the registered program may include event context, such as the identity of the target of the event (e.g., API called) and the execution element (e.g., fiber, thread, process) that triggered the event (e.g., a process identifier, thread, or code location). However, not all host environments support monitoring all interfaces, particularly intermediate and upper-level (user mode) APIs.

Most modern central processing units (CPUs) also support multiple modes of operation, including a protected mode (or user mode) and a supervisor mode (or kernel mode). A supervisor mode can be used by an operating system's kernel for low-level tasks that need unrestricted access to hardware, such as controlling how memory is written and erased, and for communication with devices like graphics cards. Protected mode, in contrast, is used for almost everything else. Applications (and user applications, in particular) generally operate within protected mode, and can only use hardware by communicating with the kernel, which controls everything in supervisor mode. CPUs may also have other modes similar to protected mode as well, such as a virtual mode for emulating older processor types (e.g., emulating a 16-bit processor on a 32-bit one, or a 32-bit processor on a 64-bit one).

Figure 2:
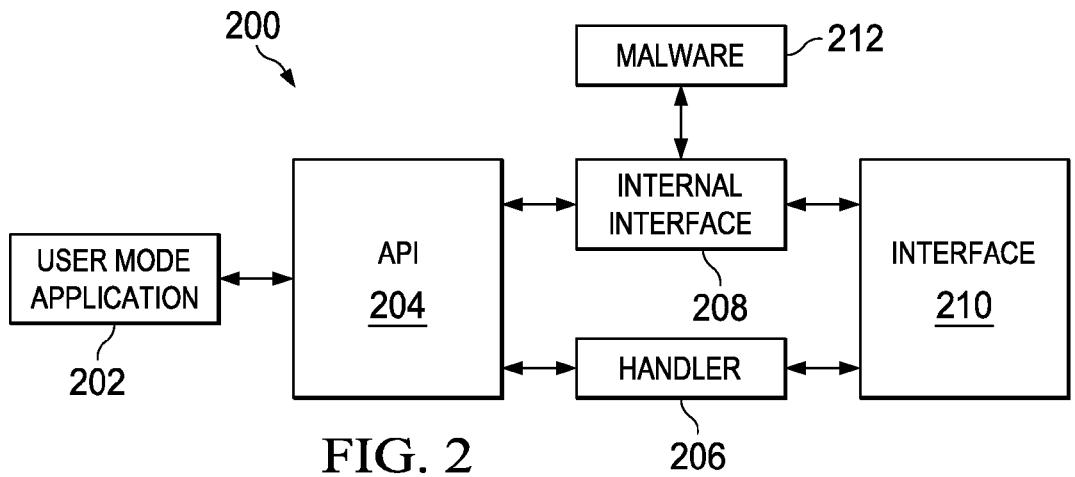
FIG. 2 is a simplified block diagram illustrating additional details that may be associated with one potential embodiment of the host environment.

Turning to FIG. 2, FIG. 2 is a simplified block diagram 200 illustrating additional details that may be associated with one potential embodiment of host environment 100. In one scenario of FIG. 2, a person may be using a user mode application 202 to create a new document, for example. Thus, application 202 may call an upper-level, user mode I/O handling API 204 to write to a file. API 204 can be monitored (e.g., by hooking or host-supported monitoring) and a callback may be sent to a handler 206. Handler 206 can store the event context (e.g., the name of API 204, a process identifier, etc.) and return execution to API 204, which may then call a lower-level, internal interface 208, such as an I/O trap handler. In this example, monitoring internal interface 208 may be unsupported or impractical because of resource limitations, and consequently, internal interface 208 is not monitored. Internal interface 208 may call yet another low-level interface 210. Host environment 100 supports monitoring interface 210 in this example, such as through a file system filter, so host environment 100 can send a callback to handler 206 (or a second handler in other embodiments). Handler 206 can then analyze the event context from the callback to determine if interface 210 should have been invoked by an upper-level interface, such as API 204.

For example, some operating systems may provide the access mode associated with a calling function, so handler 206 may determine if the calling function was a kernel mode function or a protected mode function. If it was a kernel mode function, then an upper-level interface such as API 204 would not be expected. In contrast, if the calling function was a protected mode function, then handler 206 would expect it to be called by an upper-level function. In the example embodiment of host environment 100 illustrated in FIG. 2, internal interface 208 represents a protected mode function. Thus, handler 206 may determine if an appropriate API (e.g., API 204) was called.

In a second scenario of FIG. 2, though, malware 212 may attempt to bypass monitored API 204 and directly call internal interface 208 to evade detection. Internal interface 208 then calls interface 210, which sends a callback to handler 206. Handler 206 can again analyze the context of the callback to determine if interface 210 was expected. In this example, handler 206 may generate an alert or halt execution because interface 210 was not called by a known upper-level interface.

Figure 3:
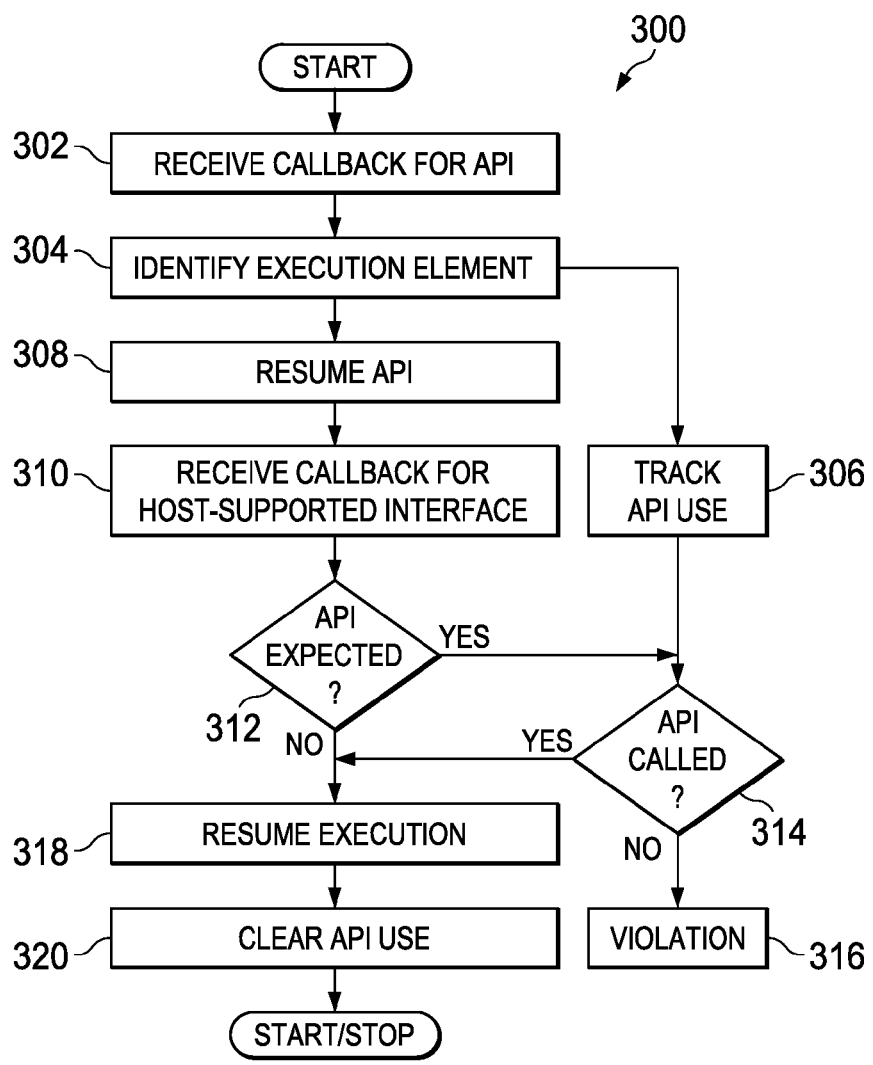
FIG. 3 is a simplified flowchart that illustrates potential operations that may be associated with certain embodiments of the host environment.

FIG. 3 is a simplified flowchart 300 that illustrates potential operations that may be associated with plumb-lining through inferred interface monitoring in certain embodiments of host environment 100. In more particular embodiments, such operations may be implemented by security monitor 104 (e.g., handler 104a, IMM 104b, and/or plumb-lining module 104c). In this example embodiment, direct monitoring of upper-level interfaces may be supported by host environment 100 or may be implemented through external techniques, such as hooking. For ease of reference, the upper-level interface will be referred to as an API, although the operations described herein may be similarly applied to other types of interfaces. Thus, as a preliminary operation, an interface monitor may be placed at an upper level interface (API), such as by in-line hooking, interface pointer redirection or a callback. For example, security monitor 104 may monitor a user mode API that creates a file. At 302, a callback for the API may be received. The element of execution (such as a process and thread) associated with the callback can be retrieved at 304, and the use of the API by the execution element can be tracked at 306. In certain embodiments, the callback can retrieve and identify the execution element. Tracking the execution element may include, for example, storing an identifier and time of execution associated with the execution element. The API can be allowed to resume at 308. At 310, a callback from host environment 100 (e.g., from operating system 107) for a lower level interface may be received.

Using algorithms based upon implementation of host environment 100, it can be determined at 312 if the upper level API should have been invoked. For example, it may be determined that a user mode process (e.g., a word processor) should have invoked an upper level file creation API to initiate a file creation operation intercepted via a kernel mode file system filter at 310. If the upper level API is not expected, then execution may resume at 318.

If the upper level API should have been invoked by the execution element, at 314 it can be determined if the API was invoked. For example, the execution element associated with the callback at 310 can be identified and compared with execution elements tracked at 306. If the API invocation cannot be identified, malware may be attempting to bypass the API monitoring, and a violation can be reported or an appropriate security policy may be implemented at 316, such as generating an alert or report, or halting execution. If the API invocation is identified, then execution may resume at 318, and tracking information can be cleared at 320.

Figure 4:
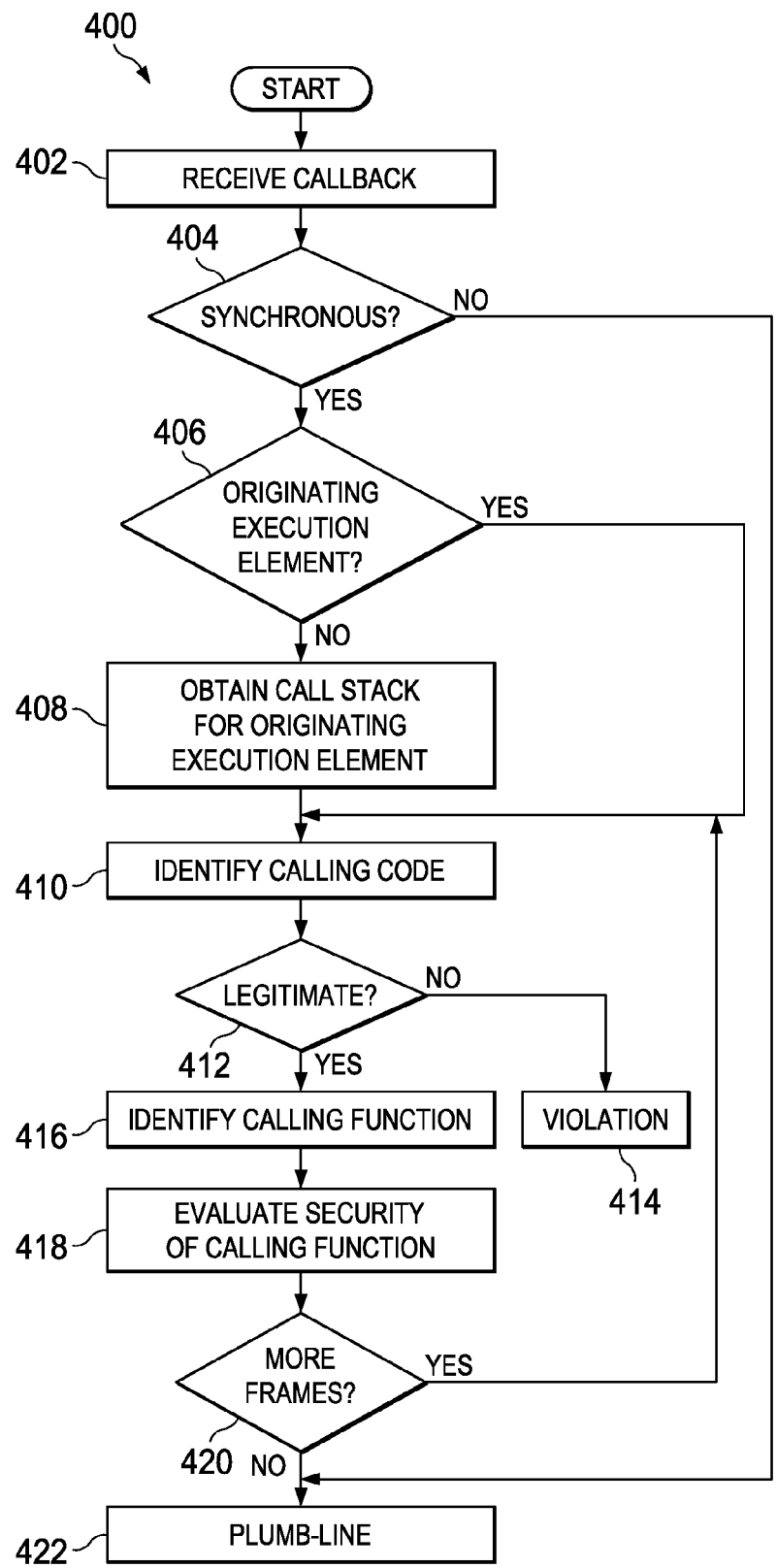
FIG. 4 is a simplified flowchart that illustrates potential operations that may be associated with certain embodiments of the host environment.

FIG. 4 is a simplified flowchart 400 that illustrates potential operations that may be associated with indirect interface monitoring in certain embodiments of host environment 100. In more particular embodiments, such operations may be implemented by security monitor 104 (e.g., handler 104a, IMM 104b, and/or plumb-lining module 104c). At 402, a callback may be received, such as from a low-level file system interface. If the callback is determined to be synchronous at 404, but not within the originating (non-arbitrary) execution element (i.e., the originating execution element is held but is not the execution element of the callback) at 406, then access to the originating execution element's memory can be obtained and the call stack located at 408. If the callback is determined to be synchronous at 404 and within the originating execution element at 406, or if the call stack is located at 408, then the call stack may be walked (e.g., using frame pointers) to identify each call frame. For each call frame of the call stack, a pointer to calling code (i.e., an instruction or code that caused the call frame to be pushed onto the call stack) can be identified at 410.

For each call frame, determine if the calling code is legitimate at 412. For example, memory identified as the call origination location (e.g., a RET address) can be analyzed to locate executable code within a memory region. The owner of this memory may then be analyzed.

In certain embodiments, analyzing the executable memory may include determining a type of the memory pointed to by an RET address. As an option, the type of the memory may include memory backed by a loaded executable, such as an executable application file or a loadable library. As another option, the type of the memory may include allocated memory not backed by a loaded executable. As yet another option, the type of the memory may include memory containing interpreted code, such as JAVASCRIPT™. For example, an interface may be invoked by an infrastructure (e.g. operating system, etc.) hosting the interpreted code, rather than the interpreted code itself. It may optionally be determined whether an association exists between the usage of the monitored interface and the interpreted language.

The owner of the executable memory may be determined in a manner that is based on the type of the executable memory. For example, if the memory is backed by a loaded executable, the owner may include a file path of the executable memory. However, if the memory is allocated memory not backed by an executable, the owner may include a process and/or thread that created the executable memory. For example, such process and/or thread may be retrieved by consulting a record of tracked memory regions.

The tracked memory regions may include memory regions within a monitored process that are tracked. It may be determined whether a memory region is allocated memory or memory within another area of interest, such as a data section. Such determination may utilize enumeration and tracking of memory regions of interest including memory dynamically allocated within a process.

At initialization, all dynamically allocated memory within the process being monitored may be enumerated. The enumeration may be performed by checking stack address ranges for each existing thread, for example, and may be performed by walking a chain of memory regions allocated from a heap.

Further, the enumeration may include walking the chains of memory regions allocated from kernel mode memory pools, such as kernel mode paged and non-paged memory pools. Walking the chains for kernel mode pool memory and associating already allocated regions with the process being monitored may be limited, depending upon operating system characteristics, such that the pool memory allocated (or associated properties modified after initialization) may be tracked, the pool memory may be tracked globally without association with a particular process, etc. Additional areas of memory to be monitored may also be enumerated during initialization. Such areas may include data sections within a process.

Still yet, an internal data structure may be populated with results of the enumeration, to facilitate tracking of dynamically allocated memory regions and to allow efficient determination if a memory address is included within a dynamically allocated memory region. Also at initialization, monitoring may be enabled for interfaces used to control dynamically allocated memory. In this way, whenever memory is dynamically allocated, resized, deleted, its properties changed, etc., callbacks may be invoked to allow updating of the internal data structure tracking dynamic memory within the process.

In one embodiment, the tracking of dynamically allocated memory may include noting characteristics of the usage of interfaces providing memory allocation, deletion, property modification, etc. For example, such characteristics may indicate a caller of the interface (e.g. was the invocation by an operating system provided function, from within dynamically allocated memory, from within data sections of a process, etc.). As an option, full tracking of pool memory may be available only for regions allocated or whose properties were modified after initialization.

With reference again to FIG. 4, in one embodiment, the determination at 412 may include a comparison of the owner of the executable memory pointed to by a call frame against a discrete list of legitimate processes and modules predetermined to be associated with an interface. In another embodiment, the determination may include tracking a history of the referenced memory regions, such as with behavioral detection. If the executable code is known or suspected to be malicious, then the operation may be identified as a potential security violation at 414.

The program context (e.g., a module, function, etc. associated with the calling code) of each call frame may also be determined at 416. For example, the call frame invocation address (or RET address) can be compared to addresses tracked for known functions. If the call frame invocation address lies within a range of addresses for a known function, then the function that invoked the next layer of the call stack can be identified, which may be comparable to intercepting an invocation of the function via direct interface monitoring.

Thus, as a preliminary operation to determine whether a memory address retrieved from a call frame lies within a known program context before initiating indirect interface monitoring, a range of memory addresses associated with a programming unit may be determined, such as by offline or runtime analysis of code within a unit. This information may be determined for each unit of interest.

In a runtime analysis, for example, a module may be analyzed to identify points of invocation, such as interface exports. These points may be sorted, and each point identified as the beginning of a function. The next point of invocation in the sorted list may be identified as the beginning of another function and the end of the previous function.

Moreover, a runtime analysis of control paths through disassembly of the module's executable code may be performed. Such a control path analysis can discover exit points to functions identified through points of invocation, which may provide a more precise determination of the boundary of each function. For example, without such a control path analysis, a function's portion of a module's memory may be assumed to be part of the preceding function if a point of invocation for the function had not been discovered.

At 418, the functions identified at 416 can be evaluated for a variety of security purposes, including assembling a collation of events for behavioral analysis, forensics, and execution profiling, for example. If additional frames remain in the stack at 420, then stack walking continues at 410. If the stack contains no more frames, or if stack walking is not possible or practical (e.g., the callback is determined to be asynchronous at 404), then plumb-lining may be used at 422 to identify potentially malicious code attempting to bypass upper-level interface monitoring, such as described above with reference to FIG. 3.

Figure 5:
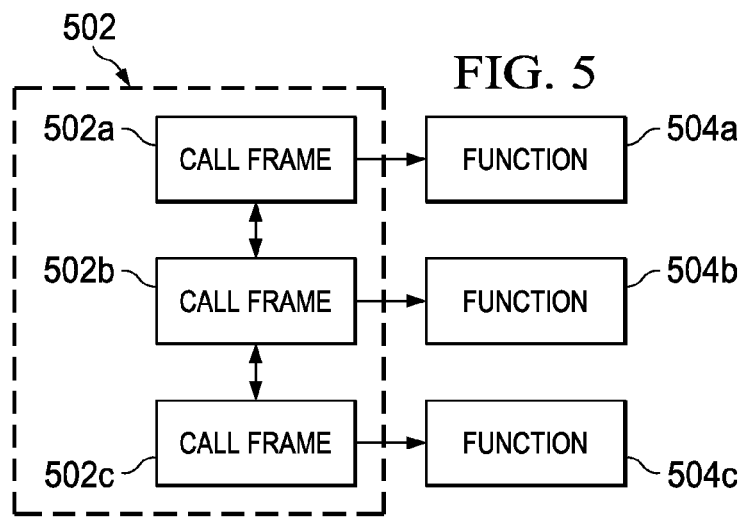
FIG. 5 is a high-level block diagram illustrating indirect monitoring through call frame analysis in example embodiments of the host environment.

FIG. 5 is a high-level block diagram 500 illustrating indirect monitoring through call frame analysis in example embodiments of host environment 100. FIG. 5 includes a stack 502, which may include any data structure capable storing information about activity of computer code. In one embodiment, for example, the stack may include call frames 502a-502c that store information about active functions that have been called but have not yet completed execution by returning. To this end, the stack may include, but is not limited to an execution stack, control stack, function stack, run-time stack, etc. A call frame may refer to information pushed onto a stack as part of a function invocation. Such information may include a pointer to calling code (e.g., a return address (RET address)). Such information may also include parameters passed to the function, storage for automatic variables of the function, and/or a pointer to a location on the stack of the stack frame of the caller. In FIG. 5, each call frame 502a-502c includes a pointer to function 504a-504c, respectively.

Stack entries can be monitored while the stack is unwound. In the present description, the foregoing stack entries may include any portion of the aforementioned stack. For example, in one embodiment, each stack entry may correspond to a call to a function that has not yet terminated with a return, a return address, one or more parameters, intermediate data, etc. Further, in one particular embodiment, each stack entry may include an individual value on a stack (e.g. a smallest amount of data that may be placed on a stack using a "push" operation, etc.). In one exemplary embodiment involving an x86 platform, the stack entry may be 4-bytes (i.e., 32 bits) in length. Further, on an x64 platform, the stack entry may be 8-bytes (i.e., 64 bits) in length (when running in a 64-bit mode).

Further, in the context of the present description, the stack may be unwound in any desired manner that results in access to the stack entries. For instance, a top stack entry may be popped off of the stack, leaving a next stack entry exposed for monitoring, etc. In one embodiment, such unwinding may refer to a backwards execution of the stack. Thus, any desired aspect of the stack may be monitored (e.g. execution of specific instructions including CPU instructions, access to memory, etc.).

Figure 6:
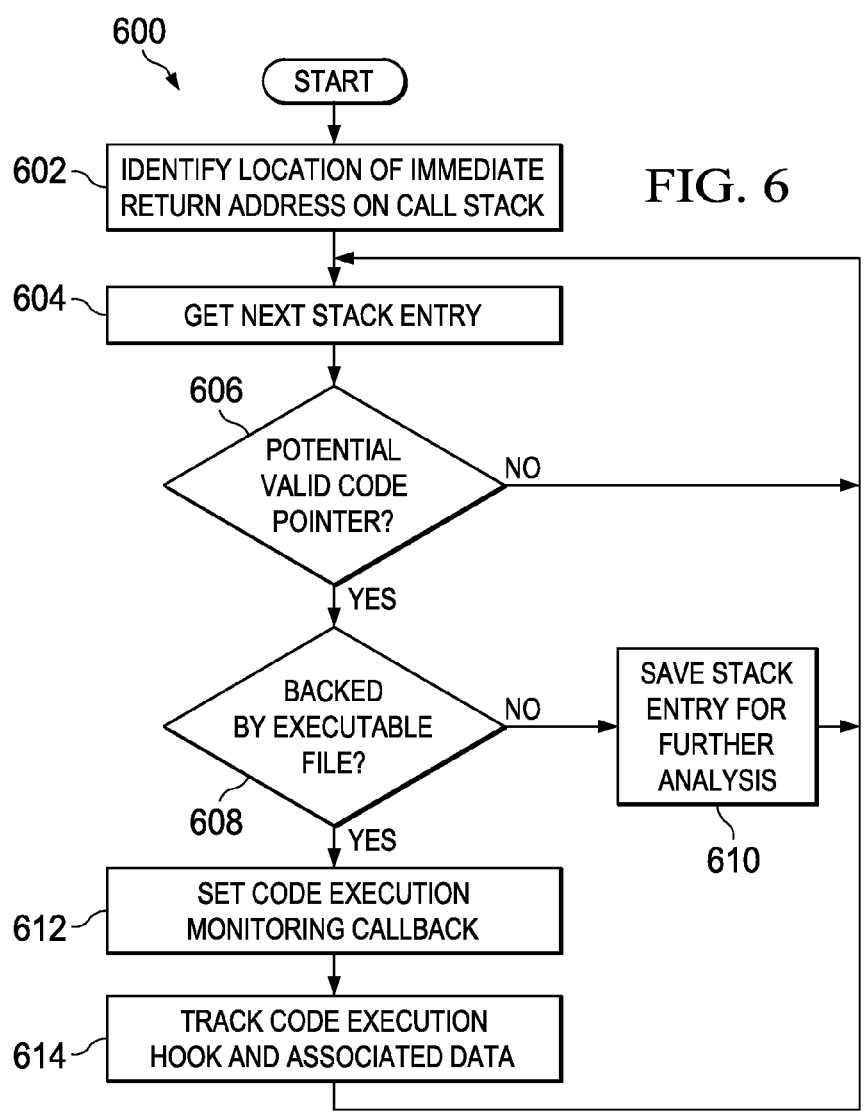
FIG. 6 is a simplified flowchart illustrating potential operations that may be associated with identifying calling code in one example embodiment of the host environment.

FIG. 6 is a simplified flowchart 600 illustrating potential operations that may be associated with identifying calling code in one example embodiment of host environment 100, such as may be implemented at 410 in FIG. 4. Although frame pointers may be used in some embodiments of host environment 100, frame pointers are not always present and are generally not present in optimized code. Thus, stack entries may be monitored while a stack is unwound to provide a more reliable process for identifying calling code in certain embodiments.

In the example embodiment of FIG. 6, direct monitoring of instruction execution is not necessarily available. In one aspect of such an embodiment, situations are accommodated where a base technology (e.g. virtual machine, etc.) may not necessarily be available, thus prompting the use of in-line hooking for execution monitoring. In another aspect, such base technology may be assumed to be available, thus allowing execution monitoring without in-line hooking, etc.

Thus, host environment 100 in this example embodiment may watch for execution paths and use the results to piece together a valid call stack beyond an immediate caller address. It may also be able to monitor the unwinding of the call stack. A location of an immediate (e.g. intermediate) return address on a call stack can be identified at 602. Beginning with such stack location, a call stack history may be searched backwards at 604, one stack entry at a time. Such search may be performed until a bottom of the stack is reached, a pre-defined search limit is exceeded, etc.

At 606, it can be determined whether a current stack entry points to code. For example, for each stack entry retrieved from the stack, such entry may be analyzed to determine the possibility of it being a valid return address marking a call frame level. In one embodiment, this may be accomplished by determining whether the stack entry points to valid memory within a process address space. Further, if the entry points to valid memory, it may optionally be determined whether the entry points to code (as opposed to data, etc.). For instance, the analysis may involve immediate bytes to determine if such bytes correspond with any valid opcodes for the relevant processor model.

If a potential valid code pointer is determined to exist at 606, a deeper analysis may ensue at 608 by determining whether the stack entry has an associated executable file. If it is determined that one of the stack entries does not have an associated executable file at 608, additional analysis can be performed on the stack entry. For example, the stack entry may be stored at 610 to support such future analysis. In some embodiments, storage at 610 may be contingent on whether the memory to which the present stack entry points is writeable.

Assuming that virtualization-enabled execution monitoring is not available, an alternative technique such as in-line hooking may require modification of memory to place hook instruction(s). Since it cannot be necessarily assumed that such code may be modified safely (e.g. it might be data, etc.), usage of the present stack entry may be tracked differently.

When placing an in-line hook, the safety of doing so is based on the instruction to be hooked. For example, there may be a risk of clobbering a subsequent instruction that could be the subject of a direct transfer by another path. This could happen, for instance, if the original instructions being replaced are shorter than the control transfer instruction placed there by a hook operation. This would result in partial modification of an instruction that follows, and this instruction may be the subject of a transfer by a thread, resulting in undefined behavior when there is an attempt to run the partially overwritten instruction.

To gauge the safety of placing a hook, the code may be examined at the address to be hooked. If the instruction at such location is at least as large as the control transfer instruction, a hook may placed. If not, however, it cannot be assumed that the hook may be inserted at such location, in which case the hooking process may be aborted. In such a case, the stack entry location and a "return address candidate" contained therein may be saved in a list, for allowing additional analysis, an example of which will be described with reference to FIG. 7.

If it is determined at 608 that one of the stack entries does have an associated executable file, it may thus be concluded that the present stack entry points to valid memory/code and is backed by an executable file. Thus, an attempt may be made to validate that the stack entry includes a return address for the caller in the next call frame, with less of a concern of overwriting data, etc.

In one embodiment, only memory that is read-only (in addition to being backed by an executable file) may be modified to place an in-line hook. In this way, the danger of modifying what appeared to be code (but is really just data, perhaps a copy of code, etc.) is avoided. It should be noted that such read-only exclusion may be changed for tuning purposes, if simply checking for a file backed by an executable proves sufficient. Again, in other embodiments where virtualization-enabled execution monitoring is available, execution of the code to which the stack entry points may be monitored at 612, irrespective of the aforementioned issues with in-line hooking.

Thus, at 612 the execution of the code to which the stack entry points may be monitored (if it is safe to do so). To accomplish this, such operation may involve setting up an execution monitoring callback of the address to which the stack entry points. Thus, if the present stack entry is indeed a return address for a next call frame, the code to which it points may be executed on a return path of the completion of the original interface, and the execution monitoring callback invoked.

The various techniques set forth above may be implemented with a variety of base technologies. For example, in the case of in-line hooking, code execution may be monitored by replacing original instructions (at the location of the code to be monitored) with control transfer instructions. When the code at the location is executed (such as due to invocation of a monitored interface), such control transfer instructions transfer execution to a monitoring callback.

To facilitate safe hooking in the situation where in-line hooking is used, short control transfer instructions may be used to provide eased fitting within a size of the existing instruction at the hook target. The use of larger control transfer instructions such as a far jump instruction may, in some embodiments, be maintained as merely a fallback technique. Of course, this is merely an optional optimization. Alternately, the far jump control transfer instruction may be used, limiting the applicability of this hooking (but simplifying implementation).

In other embodiments, virtualization may be employed utilizing a virtual machine. In the context of the present description, such a virtual machine may include any operating environment working in conjunction with, yet independent of a host environment. Examples of virtual machines include a guest operating system hosted within a virtualization framework running within a host operating system.

Of course, the foregoing embodiments are set forth by way of example only, as any base technology may be utilized. Exemplary functionality of such technology may include support for callbacks notifying registered software when monitored memory is accessed for a read, write, or execution. Further, optional support may be provided for callbacks notifying registered software when a specific CPU instruction is executed. Still yet, callbacks to third party software may be synchronous; provide for pre- and post-monitoring of the operation; allow for inspection/modification of data and parameters, and failure of an original operation. In various embodiments, the software receiving these callbacks may be running within or outside a protected system. Additional exemplary functionality may include the ability to change the registration for callbacks desired during runtime, as well as the ability for providing the monitoring capability with little overhead.

The code execution hook and associated data may be tracked at 614. To accomplish this, the execution monitoring callback may be placed in a data structure for tracking purposes. Such a data structure may be used to store data providing additional contextual information associated with the code execution that may be used to facilitate clean-up.

As shown, operations may continue moving backward in the stack to a next stack entry. In various embodiments, managing the proliferation of callback registrations may be desired. For this reason, a limit on a distance that is walked in the stack may be coupled with a limit on a number of allowable callback registrations, etc.

Figure 7:
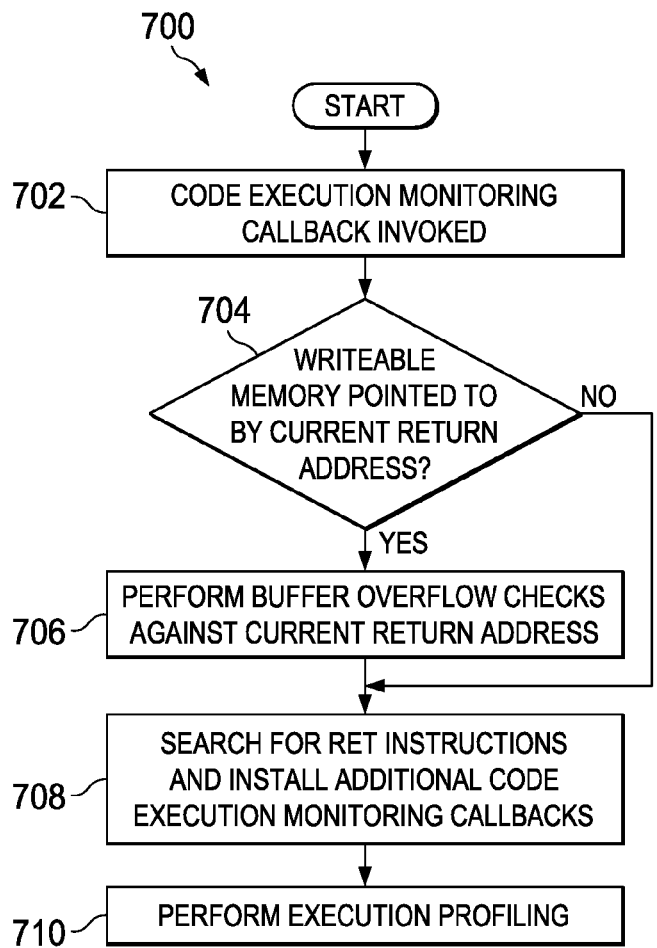
FIG. 7 is a simplified flowchart illustrating potential operations for invoking an execution monitoring callback that may be associated with one example embodiment of the host environment.

FIG. 7 is a simplified flowchart 700 illustrating potential operations for invoking an execution monitoring callback that may be associated with one example embodiment of host environment 100. For example, such operations may be carried out in the context of monitoring code execution at 612 of FIG. 6 when a previously registered callback has been invoked.

A code execution monitoring callback can be invoked at 702, and at 704 it can be determined whether a current return address associated with a stack entry points to writeable memory. If it is determined that the current return address points to writeable memory, a buffer overflow check is performed. Specifically, a buffer overflow check may be performed against the current return address at 706.

Return (RET) instructions may be identified at 708 for monitoring execution of code identified by such return instructions. For example, it may first be determined whether there are any previously noted return address candidates in a tracking list (e.g., at 610 of FIG. 6). If an initial stack walk noted stack entries as needing further analysis, and if these stack entries do not reside in the portion of the stack already passed by the stack unwinding that has occurred, the search for return instructions may proceed.

If there are entries in such a list, processing may start at a memory address whose execution triggered the callback, and then begin examining the code for return instructions. The code may be examined until hitting a point that is a specified number of bytes away from an original execution point, for example. For each return instruction (or any supported variants) found, execution monitoring of that memory may be enabled (if safe to do so) to allow for execution monitoring.

The list of registered callbacks and the list of return address candidates may be analyzed. If any were from the analysis of stack entry locations that have already been passed as the stack is unwound, they may be removed. In various embodiments, managing the proliferation of callback registrations may be desired. For this reason, a limit on a distance that is walked in the stack may be coupled with a limit on a number of allowable callback registrations, etc.

At 710, execution profiling may be performed. Such profiling may be used to correlate which caller is executing what code, etc. Still yet, using any desired heuristics and/or behavior monitoring, the execution may be profiled as malicious, etc.

Figure 8:
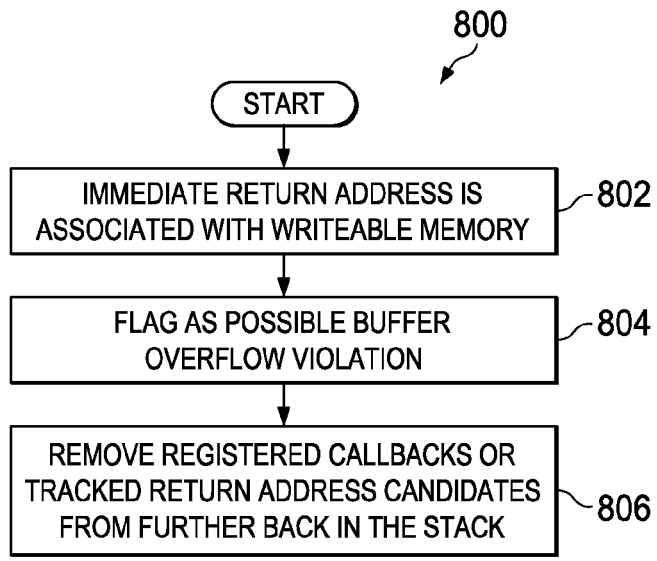
FIG. 8 is a simplified flowchart that illustrates potential operations that may be associated with monitoring the execution of an identified return instruction in another example embodiment of host environment.

FIG. 8 is a simplified flowchart 800 that illustrates potential operations that may be associated with monitoring the execution of an identified return instruction in another example embodiment of host environment 100. At 802, an address to which the return instruction is about to return can be examined. It may be determined, at such point, whether the return address was noted earlier (e.g., at 612 of FIG. 6). If so, the present stack entry may be determined to contain a return address.

Since the return address was found to point to writable memory, a potential security violation may have been discovered in the form of a possible buffer overflow attack in progress. Thus, this situation may be flagged as a possible buffer overflow violation at 804. Thus, in certain embodiments, host environment 100 may be used to detect an attempted exploitation of the buffer overflow, before it takes place.

The list of registered callbacks and the list of return address candidates may be analyzed. Specifically, if any originated from analysis of stack entry locations that have already been passed by as the stack is unwound, they may be removed at

806. As an option, the registered callbacks may be tracked on a per-thread basis within a single process instance.

In various embodiments, cleaning up registered callbacks may provide various optional benefits. For example, when an execution callback handler is invoked, it may check if there are any callback registrations still in place corresponding to locations further back in the stack. If so, it can be assumed that these no longer need to be in place, and the callback registrations may be removed. Further, the associated data for tracking them may also be cleaned up. This same approach may be applied to cleaning the list of the return address candidates.

It may also be possible that dangling callback registrations remain in place after an original interface invocation has completely returned back to the original caller in the thread or the thread has exited. To aid with this cleanup, when the monitoring software unloads, remaining callback registrations and associated data can be removed. Similarly, when the monitored process or thread terminates, this cleanup may be done at either a thread or process level. Further optimizations are possible via analysis of the code being monitored, and through the use of additional interface monitoring to allow earlier cleanup of unneeded callback registrations.

Figure 9:
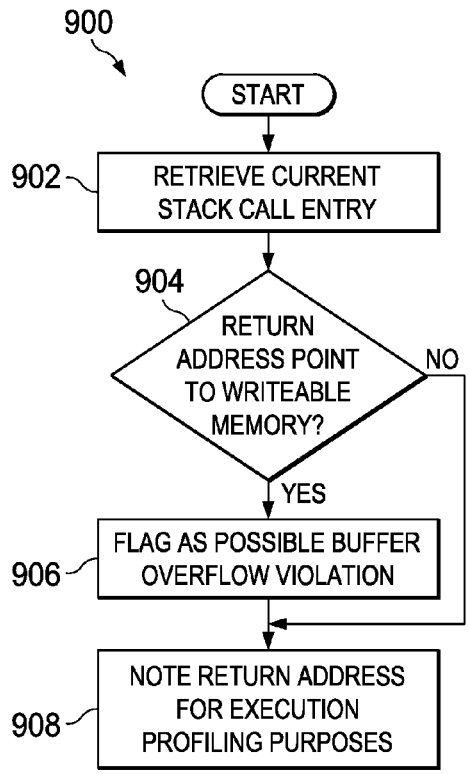
FIG. 9 is a simplified flowchart that illustrates potential operations that may be associated with analyzing stack entries that are monitored while a stack is unwound in an example embodiment of the host environment.

FIG. 9 is a simplified flowchart 900 that illustrates potential operations that may be associated with analyzing stack entries that are monitored while a stack is unwound, in accordance with an embodiment of host environment 100 having direct instruction monitoring. A current stack call frame can be retrieved at 902 for the purpose of directly accessing the return address. It can then be determined whether a current return address points to writeable memory at 904. If so, a potential security violation may have been discovered in the form of a possible buffer overflow attack in progress. Thus, this situation may be flagged as a possible buffer overflow violation at 906. The return address may also be noted for execution profiling purposes at 908 if the violation is flagged at 906 or if the return address is determined not to point to writeable memory at 904.

To this end, the return CPU instructions (and any variants) that are used to unwind a call stack may be directly monitored. This monitoring may be used for a specific process, thread, and code address range for optimization purposes. When a callback is invoked, the resultant current stack call frame may be analyzed. Such analysis may include examination for buffer overflow exploitation, execution of malware from invalid locations, and general execution profiling, as indicated above.

Monitoring certain lower-level operations as described herein provides many advantages, but may also be burdensome on system resources. Thus, in some embodiments of host environment 100, monitoring and analysis may be selectively applied to reduce the burden on system resources while allowing for expanded collection of interface use when warranted.

In one particular embodiment, for example, host environment 100 may dynamically adjust monitoring and analysis. Activity that is at least potentially associated with unwanted activity can be identified in host environment 100. The activity may include any predetermined activity capable of being identified that is at least potentially associated with unwanted activity. In one embodiment, the activity may be predetermined by a user. For example, the activity may be included in a list of various different types of predetermined activity. In another embodiment, the activity may be predetermined automatically. Just by way of example, the activity may be included in the list of various different types of predetermined activity in response to a previous determination that such activity is at least potentially associated with unwanted activity. As an option, the activity may be predetermined to be at least potentially associated with the unwanted activity. Of course, however, the activity may be predetermined in any manner.

Further, the predetermined activity may be capable of being utilized by the unwanted activity, such that the predetermined activity is at least potentially associated with the unwanted activity. As another example, the predetermined activity may be predetermined (e.g., based on a history of occurrences of the predetermined activity, etc.) to increase a vulnerability of the system to the unwanted activity. As yet another example, the predetermined activity may include activity capable of allowing the unwanted activity to be detected (e.g., self-extracting activity, etc.). It should be noted that the unwanted activity may include malware activity and/or any other activity that is unwanted.

In one embodiment, the predetermined activity may include a process connecting to an external network (e.g., the Internet, etc.). In another embodiment, the predetermined activity may include loading an executable, such as an application, dynamic link library (DLL), web browser plug-in, etc. For example, the executable may be excluded from a predefined list of known good (e.g. non-malicious) executables (e.g. executables predetermined to be associated with wanted activity), such as a whitelist of executables.

Of course, as another option, the predetermined activity may include any type of loading (e.g., loading instructions into a central processing unit (CPU), etc.). Just by way of example, the predetermined activity may include loading a process within an executable (e.g., an executable excluded from the whitelist, etc.). As another example, the predetermined activity may include loading a process from an untrusted source (e.g., a source excluded from a predefined list of trusted sources, etc.).

In yet another embodiment, the predetermined activity may include accessing a website excluded from a predefined list of known good (e.g. non-malicious) websites (e.g. websites predetermined to be associated with non-malicious activity), such as a whitelist of websites. In still yet another embodiment, the predetermined activity may include activity performed utilizing such a website. For example, the activity may include downloading content from the website, loading content from the website, etc.

In a further embodiment, the activity may include activity of a process that is not included in predetermined activity for the process. The predetermined activity for the process may include types of activity predetermined to be allowed for the process, predetermined to be historically utilized by the process, etc. Thus, the predetermined activity may optionally include elevation of privileges (e.g. system access privileges, etc.) by a process, for example, if the elevation of the privileges is predetermined to be not allowed or historically utilized by the process.

Moreover, the predetermined activity may be identified utilizing monitoring of activity on the system. As an option, the monitoring may include a base level (e.g. default level, etc.) of monitoring. For example, the base level monitoring may include monitoring for predefined types of activity that include the predetermined activity.

In one embodiment, the monitoring may include monitoring input and output (I/O) operations of host environment 100 utilizing filter drivers. Accordingly, the monitoring may utilize I/O filter drivers. The filter drivers may include file system filter drivers, just by way of example.

In another embodiment, the monitoring may be performed by implementing callback functions in host environment 100. In yet another embodiment, the monitoring may be performed by redirecting an interface (e.g., an API) invocation to a monitoring callback function utilizing a hook. The interface may optionally be redirected utilizing an inline hook. As another option, the interface may be redirected by redirecting a pointer to the interface.

A level of security applied host environment 100 may be dynamically adjusted, in response to the identification of the predetermined activity. The security applied may include monitoring, scanning (e.g., scanning at least a portion of data associated with the predetermined activity for the unwanted data, etc.), analysis, and/or any other processes capable of being applied to secure host environment 100 (e.g. from unwanted activity, etc.). To this end, the level of security may optionally include a degree of security capable of being applied.

As an option, the security may be applied at any level of granularity. For example, the security may be applied with respect to predetermined processes, threads, fibers, and/or activity initiated by code executing from a particular portion of memory of the system. Further, the level of security may be dynamically adjusted in any desired manner.

In one embodiment, the level of security may be dynamically adjusted by increasing the level of security. For example, the level of security may be increased by performing additional monitoring (e.g., beyond the base level monitoring performed to identify the predetermined activity). As an option, the additional monitoring may include monitoring for additional types of predetermined activity not monitored by the base level monitoring.

As another example, the level of security may be increased by performing additional monitoring of the predetermined activity (e.g., beyond the base level monitoring performed to identify the predetermined activity). As an option, the additional monitoring may include monitoring for additional types of accesses performed by the identified predetermined activity that are not otherwise monitored by the base level monitoring. Such accesses may include creating opening, writing to, deleting, etc. files, in various embodiments.

As yet another example, the level of security may be increased by expanding scanning. The scanning may include searching data stored host environment 100 for patterns that match previously identified patterns of unwanted data (e.g., malware patterns, etc.). The previously identified patterns of unwanted data may be stored in a database, as an option. For example, data may be scanned utilizing signatures of unwanted data for determining whether such data is unwanted.

In one embodiment, the scanning may be expanded with respect to a base level of scanning implemented during the identification of the predetermined activity. As an option, the base level of scanning may be capable of scanning a first subset of file operations for unwanted data, whereas the expanded scanning may be capable of scanning a second subset of file operations that includes more file operations than then first subset. As another option, the expanded scanning may be capable of scanning more portions of memory of the system than the base level scanning.

In yet another embodiment, the level of security may be dynamically adjusted by decreasing the level of security. For example, the level of security may be decreased by performing less monitoring of the system (e.g., less than the base level monitoring performed to identify the predetermined activity). As an option, the lessened monitoring may include monitoring for fewer types of predetermined activity than that monitored by the base level monitoring.

As another example, the level of security may be decreased by performing less monitoring of the predetermined activity (e.g. less than the base level monitoring performed to identify the predetermined activity). As an option, the lessened monitoring may include monitoring for fewer types of accesses performed by the identified predetermined activity than that monitored by the base level monitoring.

As yet another example, the level of security may be decreased by reducing the scanning. In one embodiment, the scanning may be reduced with respect to a base level of scanning implemented during the identification of the predetermined activity. As an option, the base level of scanning may be capable of scanning a first subset of file operations for unwanted data, whereas the reduced scanning may be capable of scanning only a fraction of the first subset of file operations. As another option, the reduced scanning may be capable of scanning fewer portions of memory than that capable of being scanned by the base level scanning.

To this end, the level of security may be dynamically adjusted in response to identification on the system of predetermined activity that at least potentially includes unwanted activity. Such dynamically adjusted security may be utilized to reduce system resource consumption resulting from unwanted activity detection processes when predetermined activity potentially associated with the unwanted activity is not identified. Similarly, the dynamically adjusted security may be utilized to increase a level of unwanted activity detection utilized when predetermined activity potentially associated with the unwanted activity is identified, such that the unwanted activity may be prevented from evading detection that may otherwise occur due to the application of lower level security.

It should be noted that as another option, the level of security may be dynamically adjusted in response to identification of the predetermined activity and a history of predetermined activity identified in host environment 100. The identification of the predetermined activity and the history of predetermined activity may be evaluated for determining a behavior of host environment 100, such that the level of security may be dynamically adjusted based on the behavior of host environment 100.

For example, if the latest identification of the predetermined activity and the history of predetermined activity exceeds a maximum threshold, the level of security may be increased. Similarly, if the latest identification of the predetermined activity and the history of predetermined activity is lower than a minimum threshold, the level of security may be decreased.

In one exemplary embodiment, host environment may be monitored at a base level for various types of predetermined activity. One of such types of predetermined activity may include execution of a packer, for example. The packer may include a self-extracting payload capable of being utilized by malware to extract or decrypt portions of the malware from the payload such that the extracted or decrypted malware portions may be executed.

Thus, based on the monitoring at the base level, activity including extraction or decryption of a payload may be identified. In response to the identification of such activity, a level of security may be dynamically adjusted. For example, the level of security may be dynamically increased to a level of security higher than a base level of scanning enabled during identification the activity.

As an option, the increased level of security may include performing scanning of data associated with the packer (e.g., the extracted data, etc.) for determining whether the data is unwanted. In this way, malware that is exposed to detection by being extracted from a payload may be detected utilizing the increased level of security.

In another exemplary embodiment, a data leakage prevention system may perform the base level of monitoring for identifying an open operation of files that include confidential data, personally identifiable information (e.g., social security number), etc. In response to identification of the open operation associated with such a file, a level of security (e.g. monitoring and scanning) applied to the process utilized to perform the open operation may be dynamically increased.

In yet another exemplary embodiment, the level of security may be adjusted with respect to forensics. For example, host environment 100 may utilize such forensics for establishing various facts. Thus, host environment 100 may optionally utilize forensics to identify predetermined activity that is at least potentially associated with unwanted activity, and may further dynamically adjust a level of security based on the identification of the predetermined activity.

Figure 10:
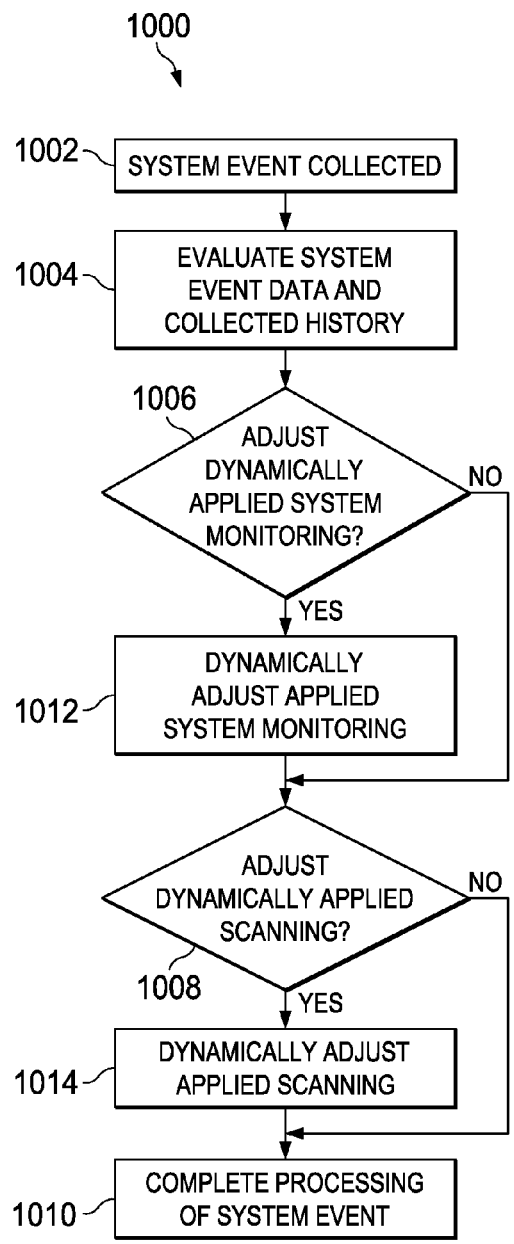
FIG. 10 is a simplified flowchart that illustrates potential operations that may be associated with processing an event utilizing a dynamically adjusted level of security in an example embodiment of the host environment.

FIG. 10 is a simplified flowchart 1000 that illustrates potential operations that may be associated with processing an event utilizing a dynamically adjusted level of security, in accordance with an example embodiment of host environment 100.

A system event may be collected at 1002. In the context of the present embodiment, the system event may include any predetermined activity on a system (e.g., host environment 100) that is at least potentially associated with unwanted activity. For example, a system event may be collected in response to a determination that the system event is a predetermined type of system event.

As an option, collecting the system event may include identifying the system event. As another option, collecting the system event may include logging the system event in a history of collected system events. As yet another option, the system event may be collected utilizing a base level monitoring for such system event.

Additionally, the system event and a collected history can be evaluated at 1004. In one embodiment, the collected history may include the history of collected system events noted above. For example, the collected history may include a history of system events that are each a predetermined type of system event.

In another embodiment, the system event and collected history may be evaluated according to a predefined policy. Just by way of example, the system event and collected history may be compared to at least one rule included in the predefined policy. In yet another embodiment, the system event and collected history may be evaluated utilizing a behavioral analysis.

Further, at 1006 it may be determined whether applied system monitoring is to be dynamically adjusted. The applied system monitoring may include the base level monitoring utilized to collect the system event at 1002. Of course, however, the applied system monitoring may include any monitoring enabled on the system.

As an option, the determination may be based on the evaluation of the system event and collected history. For example, the determination may be based on whether the policy has been violated by the system event and collected history. Thus, in one embodiment, it may be determined that the applied system monitoring is to be dynamically adjusted if the policy (e.g. rule of the policy) has been violated by the system event and collected history.

If it is determined that the applied system monitoring is to be dynamically adjusted, the applied system monitoring can be dynamically adjusted at 1012. The adjustment of the applied system monitoring may include dynamically increasing or decreasing a level of the applied system monitoring, in various embodiments. Moreover, the policy may optionally indicate whether the level of the applied system monitoring is to be dynamically increased or decreased.

In response to the dynamic adjustment of the applied system monitoring at 1012 or if it is determined that the applied system monitoring is not to be dynamically adjusted at 1006, it can be further determined whether applied scanning is to be dynamically adjusted at 1008. The applied scanning may include a base level of scanning applied to the system during the collection of the system event at 1002. Of course, however, the applied scanning may include any scanning enabled on the system. Such scanning may be utilized for scanning data on the system for unwanted data, in one embodiment.

As an option, the determination of whether the applied scanning is to be dynamically adjusted may be based on the policy. For example, the determination may be based on whether the policy has been violated by the system event and collected history. Thus, in one embodiment, it may be determined that the applied scanning is to be dynamically adjusted if the policy (e.g. rule of the policy) has been violated by the system event and collected history. As another option, the determination of whether the applied scanning is to be dynamically adjusted may be based on the type of the system event collected (e.g. according to predefined rules, etc.).

If it is determined that the applied scanning is to be dynamically adjusted, the applied scanning may be dynamically adjusted at 1014. The adjustment of the applied scanning may include dynamically increasing or decreasing a level of the applied scanning, in various embodiments. Moreover, the policy may optionally indicate whether the level of the applied scanning is to be dynamically increased or decreased.

In response to the dynamic adjustment of the applied scanning at 1014, or if it is determined that the applied scanning is not be dynamically adjusted at 1008, processing of the system event can be completed at 1010. In one embodiment, processing of the system event may include further monitoring of the system event. In this way, the system event may be monitored at the dynamically adjusted level of system monitoring if it is determined at 1006 that the applied system monitoring is to be dynamically adjusted.

In another embodiment, processing of the system event may include scanning the system event. For example, the system event may be scanned for unwanted data. Thus, as an option, the system event may be scanned at the dynamically adjusted level of scanning if it is determined at 1008 that the applied scanning is to be dynamically adjusted.

As an option, if the applied system monitoring and/or the applied scanning is dynamically adjusted in response to the collection of the system event, the dynamically adjusted system monitoring and/or applied scanning may be dynamically readjusted in response to completion of the processing of the system event. For example, the applied system monitoring and/or the applied scanning may be readjusted to the level (e.g. base level) that was previously applied to the system when the system event was collected at 1002. Of course, however, the applied system monitoring and/or the applied scanning may be readjusted at any time, such as based on the collection of additional system events.

Figure 11:
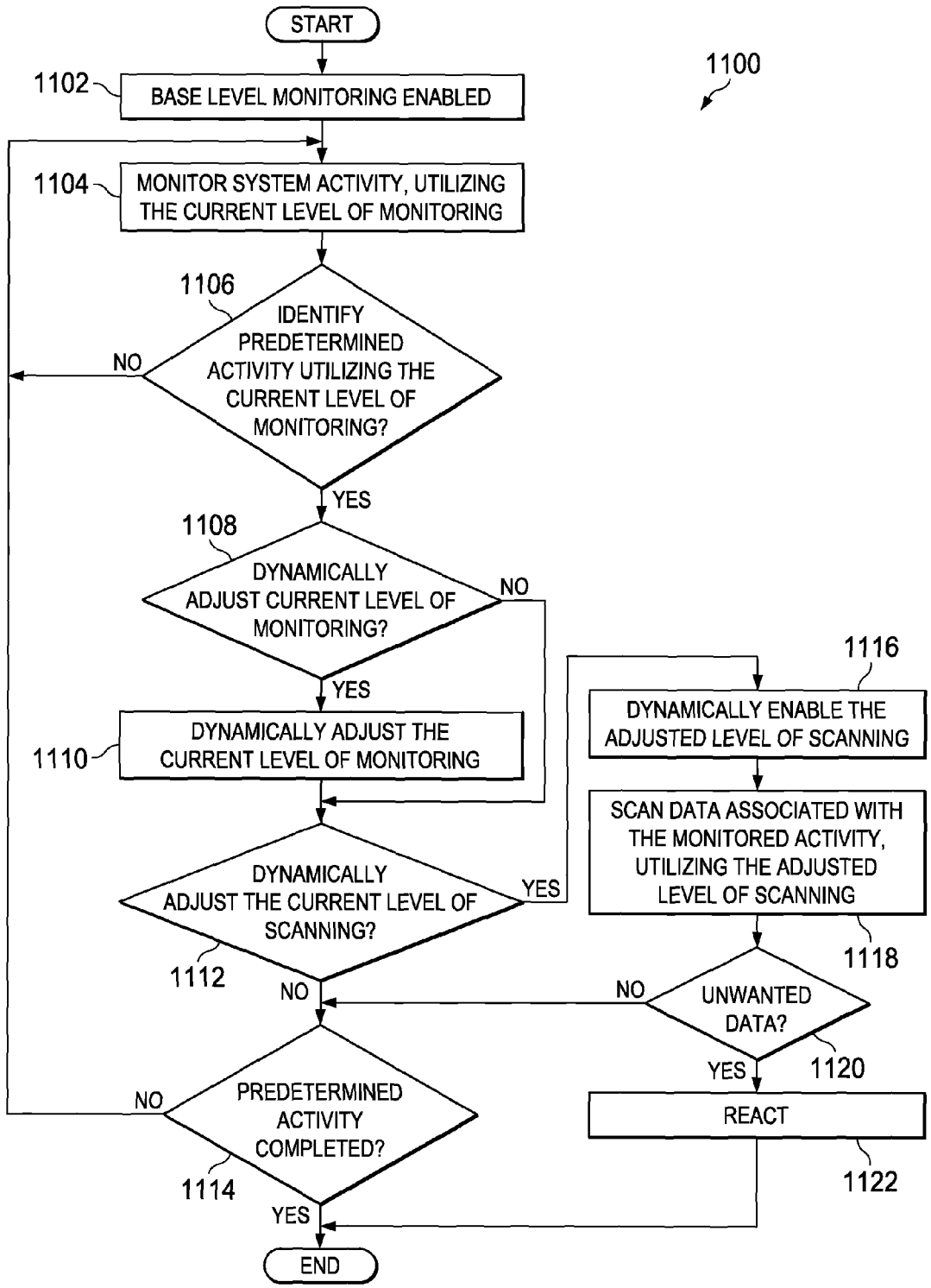
FIG. 11 is a simplified flowchart that illustrates potential operations that may be associated with detecting unwanted data utilizing a dynamically adjusted level of security in an example embodiment of the host environment.

FIG. 11 is a simplified flowchart 1100 that illustrates potential operations that may be associated with detecting unwanted data utilizing a dynamically adjusted level of security, in accordance with yet another example embodiment of host environment 100. A base level of monitoring can be enabled at 1102. The base level of monitoring may include a default level of monitoring (e.g. preconfigured by a user, etc.). As an option, the base level of monitoring may be enabled for a system upon startup of the system.

In addition, system activity can be monitored utilizing the current level of monitoring at 1104. The current level of monitoring may include the enabled level of monitoring. Thus, in response to enablement of the base level of monitoring at 1102, the system activity may be monitored utilizing such base level of monitoring. The system activity may be monitored for identifying predetermined activity on the system, with respect to the present embodiment.

Further, at 1106 it can be determined whether the predetermined activity is identified utilizing the current level of monitoring. If it is determined that the predetermined activity is not identified utilizing the current level of monitoring, system activity can continue to be monitored utilizing the current level of monitoring at 1104. In this way, system monitoring may be continuously performed for identifying predetermined activity on the system.

If, however, it is determined that the predetermined activity is identified utilizing the current level of monitoring, it can be further determined whether the current level of monitoring is to be dynamically adjusted at 1108. In one embodiment, the determination may be based on a policy. For example, the policy may indicate the level of monitoring to be enabled in response to identification of the particular type of predetermined activity identified at 1106.

If it is determined that the current level of monitoring is to be dynamically adjusted, the current level of monitoring can be dynamically adjusted at 1110. In various embodiments, the current level of monitoring may be adjusted by being increased or decreased (e.g. based on the policy, etc.). As an option, the adjusted current level of monitoring may only be used for monitoring the identified predetermined activity, such that the previous level of monitoring (e.g. the base level) may be utilized for monitoring remaining system activity. Of course, as another option, the adjusted current level of monitoring may be used for monitoring all system activity.

In response to the dynamic adjustment of the current level of monitoring at 1110, or if is determined that the current level of monitoring is not to be dynamically adjusted at 1108, it can be further determined whether the current level of scanning is to be dynamically adjusted at 1112. The current level of scanning may include a level of scanning enabled on the system. In one embodiment, the determination may be based on the policy. For example, the policy may indicate the level of scanning to be enabled in response to identification of the particular type of predetermined activity identified at 1106.

If it is determined that the current level of scanning is not to be dynamically adjusted, it can be determined whether the predetermined activity has completed at 1114. If it is determined that the predetermined activity has not completed, system activity can continue to be monitored utilizing the current level of monitoring at 1104. In this way, the predetermined activity may continue to be monitored at the current level of monitoring until completion of such predetermined activity. As an option, in response to a determination that the predetermined activity has completed, the level of monitoring may be readjusted to the base level of monitoring.

If it is determined that the current level of scanning is to be dynamically adjusted, an adjusted level of scanning can be dynamically enabled at 1116. In various embodiments, the current level of scanning may be adjusted by being increased or decreased (e.g. based on the policy, etc.). For example, the current level of scanning may be adjusted such that fewer or additional scanning operations are enabled.

Still yet, at 1118 data associated with the monitored activity can be scanned utilizing the adjusted level of scanning. In one embodiment, the data associated with the monitored activity may include all data (e.g. code, files, etc.) utilized by, accessed by, the source for, etc. all activity monitored on the system subsequent to the adjustment to the level of scanning. In another embodiment, the data associated with the monitored activity may include only the data associated with the predetermined activity identified at 1106.

Further, the data associated with the monitored activity may be scanned for unwanted data. For example, such data may be scanned for malware. To this end, it can be determined whether the data associated with the monitored activity includes unwanted data at 1120.

If it is determined that the data associated with the monitored activity does not include unwanted activity, it can be determined whether the predetermined activity has completed at 1114, as described above. If, however, it is determined that the data associated with the monitored activity includes unwanted data, a reaction can be performed at 1122. The reaction may include any reaction to the unwanted activity. Just by way of example, the reaction may include blocking the activity associated with the data, quarantining the data, reporting the unwanted data, logging the unwanted data, etc. In this way, unwanted data may be detected utilizing the dynamically adjusted level of monitoring and/or scanning.

It is important to note that the steps in the appended diagrams illustrate only some of the possible scenarios and patterns that may be executed by, or within, host environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by host environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:

monitoring, by a processor, a first interface by directly monitoring the first interface, wherein the first interface is associated with a call stack of call frames pushed onto the call stack;

monitoring, by the processor, a second interface by:

identifying, based on a callback, a calling code associated with the second interface by unwinding one of the call frames of the call stack associated with the first interface, wherein the call frame includes a pointer to the calling code and one or more parameters passed to the calling code and wherein the calling code caused the call frame to be pushed to the stack; and identifying a program context associated with the calling code; and taking a policy action if the second interface is not executed before the first interface.

2. The method of claim 1, wherein monitoring the second interface comprises indirectly monitoring the second interface.

3. The method of claim 1, wherein monitoring the second interface comprises walking a call stack associated with the first interface.

4. The method of claim 1, further comprising: determining if the calling code is legitimate; and taking the policy action if the calling code is not legitimate.

5. The method of claim 1, wherein monitoring the first interface comprises:

storing data associating an execution element with the first interface.

6. The method of claim 1, wherein:

the first interface is a kernel-mode interface; and monitoring the second interface comprises walking a call stack associated with the kernel-mode interface.

7. The method of claim 1, wherein:

monitoring the first interface comprises receiving a callback on execution of the first interface and storing data associating an execution element with the execution of the first interface.

8. The method of claim 1, further comprising tracking an execution element associated with the first interface and wherein the policy action is taken if the second interface is not executed by the execution element.

9. The method of claim 8, wherein the tracking includes storing an identifier of the execution element and a time of execution associated with the execution element.

10. The method of claim 8, wherein the execution element is at least one of:

a thread; and a fiber.

11. The method of claim 1, wherein the call frame further includes one or more local variables for the calling code.

12. One or more non-transitory tangible media encoding logic that include instructions for execution that, when executed by a processor, is operable to perform operations comprising:

monitoring, by a processor, a first interface by directly monitoring the first interface, wherein the first interface is associated with a call stack of call frames pushed onto the call stack;

monitoring, by the processor, a second interface by:

identifying, based on a callback, a calling code associated with the second interface from one of the call frames of the call stack associated with the first interface, wherein the call frame includes a pointer to the calling code and one or more parameters passed to the calling code and wherein the calling code caused the call frame to be pushed onto the stack;

identifying a function within the calling code to determine security of the function; and taking a policy action if the second interface is not executed before the first interface.

13. The media of claim 12, wherein the operations further comprise:

tracking an execution element associated with the first interface and wherein the policy action is taken if the second interface is not executed by the execution element.

14. The media of claim 13, wherein the tracking includes storing an identifier of the execution element and a time of execution associated with the execution element.

15. The media of claim 12, wherein identifying the calling code includes:

unwinding the call frame to access each entry of the call frame;

determining whether an entry points to valid memory within a process address space; and if the entry points to valid memory, determining whether the entry is the pointer that points to the calling code and not data within the memory.

16. The media of claim 12, wherein the operations further comprise:

determining a type of memory pointed to by the pointer.

17. The media of claim 16, wherein the type of memory is at least one of:

memory backed by a loaded executable application file;

memory not backed by a loaded executable application file; and memory containing interpreted code.

* * * * *